(12) United States Patent
Madden

(10) Patent No.: US 6,255,992 B1
(45) Date of Patent: Jul. 3, 2001

(54) SELF-CALIBRATING LARGE BASELINE INTERFEROMETER FOR VERY PRECISE EMITTER LOCATION USING TIME DIFFERENCE OF ARRIVAL AND TIME DIFFERENCE OF ARRIVAL RATE

(75) Inventor: Thomas L. Madden, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/549,107

(22) Filed: Apr. 13, 2000

(51) Int. Cl.$^7$ .................................................. G01S 5/02
(52) U.S. Cl. .................................. 342/424; 342/442
(58) Field of Search ............................. 342/424, 442, 342/458, 465

(56) References Cited

U.S. PATENT DOCUMENTS

| | | |
|---|---|---|
| 3,568,198 | 3/1971 | Borowitz et al. . |
| 3,687,556 | 8/1972 | Price et al. . |
| 3,842,419 | 10/1974 | Arndt . |
| 3,900,879 | 8/1975 | Lewinter . |
| 3,936,831 | 2/1976 | Jones . |
| 4,215,345 | 7/1980 | MacDoran . |
| 4,463,357 | 7/1984 | MacDoran . |
| 4,642,649 | 2/1987 | Lightfoot . |
| 4,673,944 * | 6/1987 | Grave ................................ 342/424 |
| 4,734,702 | 3/1988 | Kaplan . |
| 4,797,679 | 1/1989 | Cusdin et al. . |
| 5,053,784 | 10/1991 | Hippelainen . |
| 5,285,209 * | 2/1994 | Sharpin et al. ..................... 342/424 |
| 5,302,957 | 4/1994 | Franzen . |
| 5,327,145 | 7/1994 | Jelinek . |
| 5,343,212 | 8/1994 | Rose et al. . |
| 5,526,001 | 6/1996 | Rose et al. . |
| 5,708,443 | 1/1998 | Rose . |
| 5,724,047 | 3/1998 | Lioio et al. . |
| 5,914,687 | 6/1999 | Rose . |
| 5,999,129 | 12/1999 | Rose . |

\* cited by examiner

*Primary Examiner*—Mark Hellner
(74) *Attorney, Agent, or Firm*—Gerald B. Hollins; Thomas L. Kundert

(57) ABSTRACT

A passive system for locating a distant source of radio frequency energy, for example a pulsed radar transmitter, from a portable platform such as a moving aircraft. The disclosed system is non ambiguous in locating ability by way of using time difference of arrival and time difference of arrival-rate processing of signals received from the distant source. This is in contrast with phase-based locating wherein location ambiguities are inherent. The disclosed system is supported by an included recalibration subsystem enabling practical maintenance of time difference of arrival system algorithm accuracy notwithstanding physical component and signal delay changes attributable to thermal or other environment effects. Maintenance of delay measurements accurate into the tens of picosecond range by this recalibration arrangement are employed to obtain usefully precise energy source locations. Mathematical equation-based disclosures of signal delay algorithms and their recalibration are included.

19 Claims, 8 Drawing Sheets

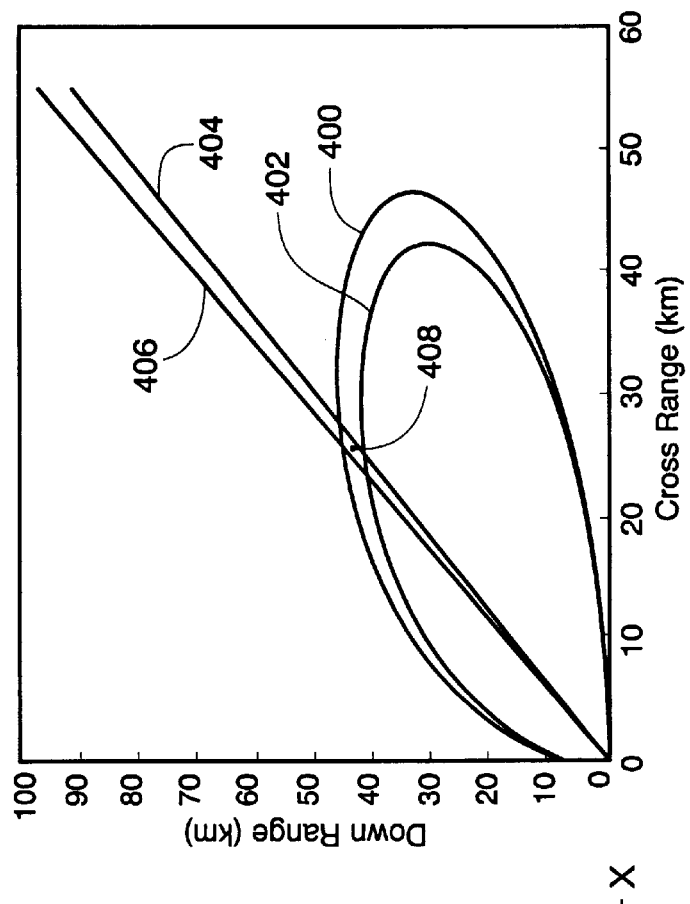
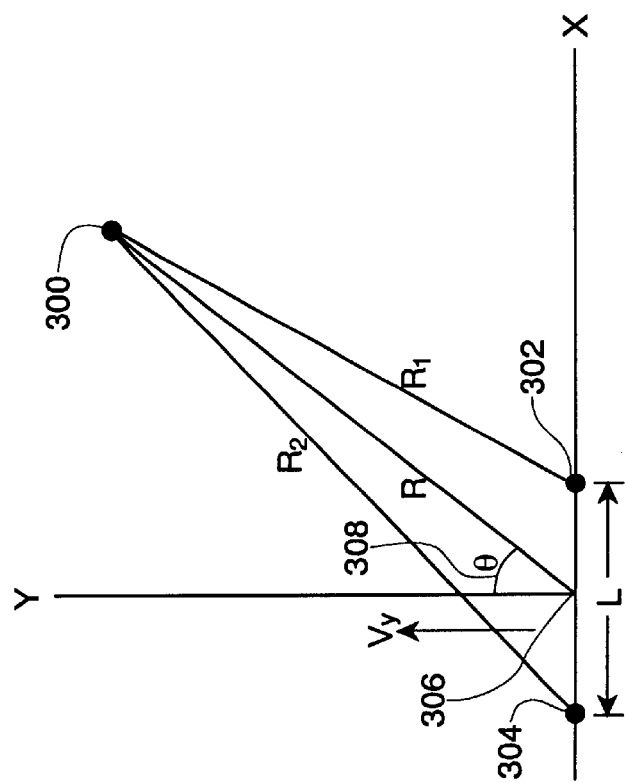
Fig. 4
Fig. 3

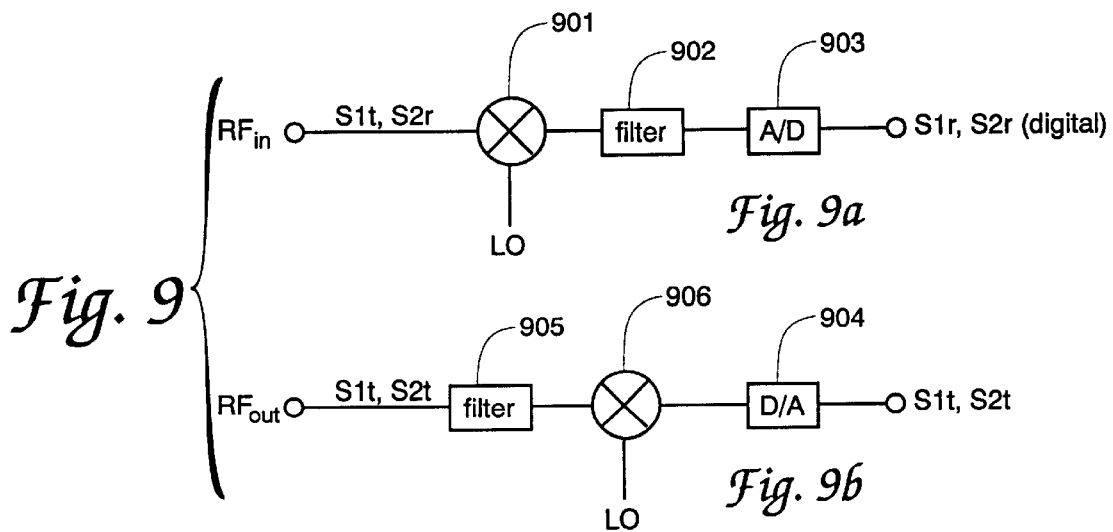
*Fig. 9*
*Fig. 9a*
*Fig. 9b*
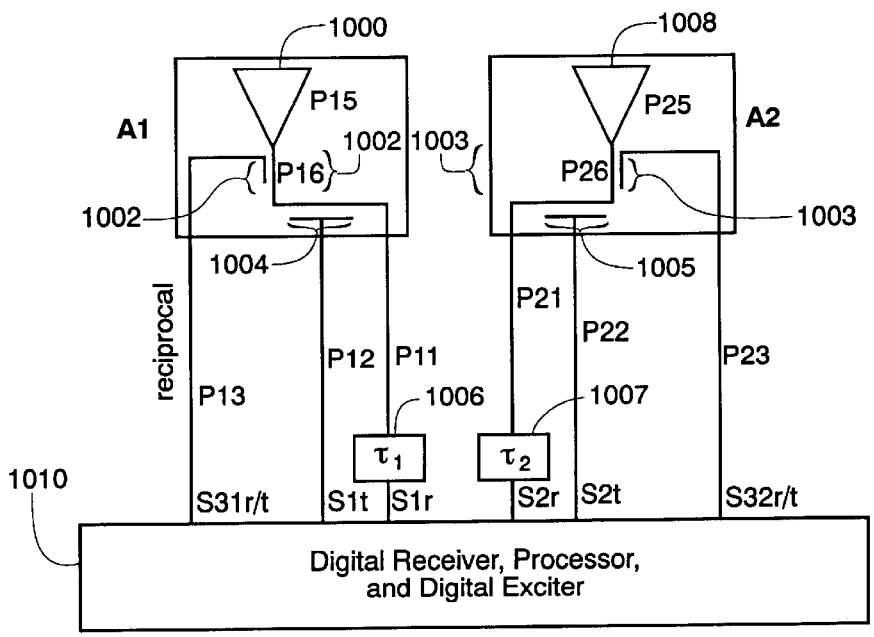
*Fig. 10*

P76=P67=P6+P7

SELF-CALIBRATING LARGE BASELINE INTERFEROMETER FOR VERY PRECISE EMITTER LOCATION USING TIME DIFFERENCE OF ARRIVAL AND TIME DIFFERENCE OF ARRIVAL RATE

RIGHTS OF THE GOVERNMENT

The invention described herein may be manufactured and used by or for the Government of the United States for all governmental purposes without the payment of any royalty.

BACKGROUND OF THE INVENTION

This invention relates to the field of remote energy-emitting source location through passive received signal processing.

Although radio locating has been used since the early days of radio, current military apparatus with its limited output signal durations and the availability of computerized signal processing, faster analog to digital conversion apparatus and a need to accomplish rapid accurate signal locations from a moving vehicle provide opportunity for improvement in this art.

Present aircraft based radio frequency emitter locating methods for example require use of two platforms to obtain angle and range data relating to a radio frequency emitting energy source or one platform flying for some seconds to obtain a multiple line of bearings (i.e., multiple angles of arrivals). In both of these cases range is determined by an intersection on multiple line of bearings. In this invention precisely measured time difference of arrival and a single aircraft are used to determine line of bearing to an emitter and time difference of arrival rate at this aircraft is used to determine emitter range.

SUMMARY OF THE INVENTION

The present invention provides unambiguous locating of a distant source of radio frequency energy from a moving platform, such as an aircraft. The identified location may be relative to the search aircraft or may be a geolocation determined with respect to the earth. The distant emission source may be of a pulsed output nature, such as a radar apparatus, and the achieved location may be accomplished with as little as two successive emission pulses.

It is an object of the present invention, therefore, to provide rapid accurate location of a stationary ground emitter, such as a radar transmitter, from a moving platform.

It is another object of the invention to provide distant radar location in azimuth, elevation and range through concurrent use of two nominally orthogonal large baseline interferometers.

It is another object of the invention to provide a time based unambiguous locating system for a distant radio frequency energy source.

It is another object of the invention to provide location of a radar emission which may be random pulse to pulse frequency agile.

It is another object of the invention to provide a time based distant radio frequency source locating arrangement in which a calibration sub system maintains usable accuracy notwithstanding presence of environmental-sourced and other inaccuracy influences.

It is another object of the invention to provide a time based distant radio frequency source locating arrangement employing a recalibration-correctable locating algorithm.

It is another object of the invention to provide a distant radio frequency source locating arrangement embodied in a moving platform, such as an aircraft, and employing platform-peripheral signal collection.

It is another object of the invention to provide a distant radio frequency source locating arrangement capable of enhanced location accuracy through use of an input antenna separation-enhancing trailing antenna member.

It is another object of the invention to provide a distant radio frequency source locating arrangement supported by a propagation time-based mathematical algorithm.

It is another object of the invention to provide a distant radio frequency source locating arrangement supported by a propagation time delay-based array of mathematical equations.

It is another object of the invention to provide a time difference of arrival emission source locating arrangement disposable in either of the azimuth or elevation planes, a locating arrangement usable in replication to determine both azimuth and elevation locations of a distant radio frequency source.

It is another object of the invention to provide both relative and absolute or geo location of a remote radio frequency emission source.

It is another object of the invention to provide rapid location of a remote radio frequency emission source, that is location within the time of a second or less.

It is another object of the invention to provide a long baseline interferometer and moving platform digital apparatus for distant emission source location.

It is another object of the invention to provide an airborne distant emission source location arrangement in which known aircraft velocity and long baseline interferometer-determined angle of arrival information are used to determine emitter location.

Additional objects and features of the invention will be understood from the following description and claims and the accompanying drawings.

These and other objects of the invention are achieved by an airborne long baseline interferometer radio frequency signal emitter source locating apparatus comprising the combination of:

a signal emitter search aircraft containing first and second radio frequency receivers and input and output signal conveying members connected therewith;

said first and second radio frequency receivers being disposed in receipt of signals from said radio frequency signal emitter source by way of first and second antenna members disposed in physically separated portions of said aircraft and said signal conveying members;

time difference of arrival signal processing apparatus received in said aircraft in communication with output signals of said first and second radio frequency receivers, said apparatus being responsive to ranges of arrival time difference and arrival time difference rate occurring in signals from said radio frequency signal emitter source output by said first and second radio frequency receivers;

selectively operable signal propagation time delay calibration apparatus electively connectable with said signal conveying members in paths interconnecting said first and second antennas with said time difference of arrival signal processing apparatus and generating picosecond-resolved measurement data representing environment-induced changes in signal propagation delay attending signal propagation in said signal conveying members.

BRIEF DESCRIPTION OF THE DRAWINGS

FIG. 3 shows geometric relationships applicable to the radio frequency signals in one arrangement of the present invention.

FIG. 4 shows a family of time and angle error curves relating to the FIG. 3 geometric relationships and their attending mathematical equations.

FIG. 9 shows in FIG. 9a and FIG. 9b a single channel digital receiver and a single channel digital exciter usable in implementing a portion of the present invention.

FIG. 10 shows another arrangement of a time difference of arrival-responsive locator system according to the present invention.

DETAILED DESCRIPTION

Figure 1:
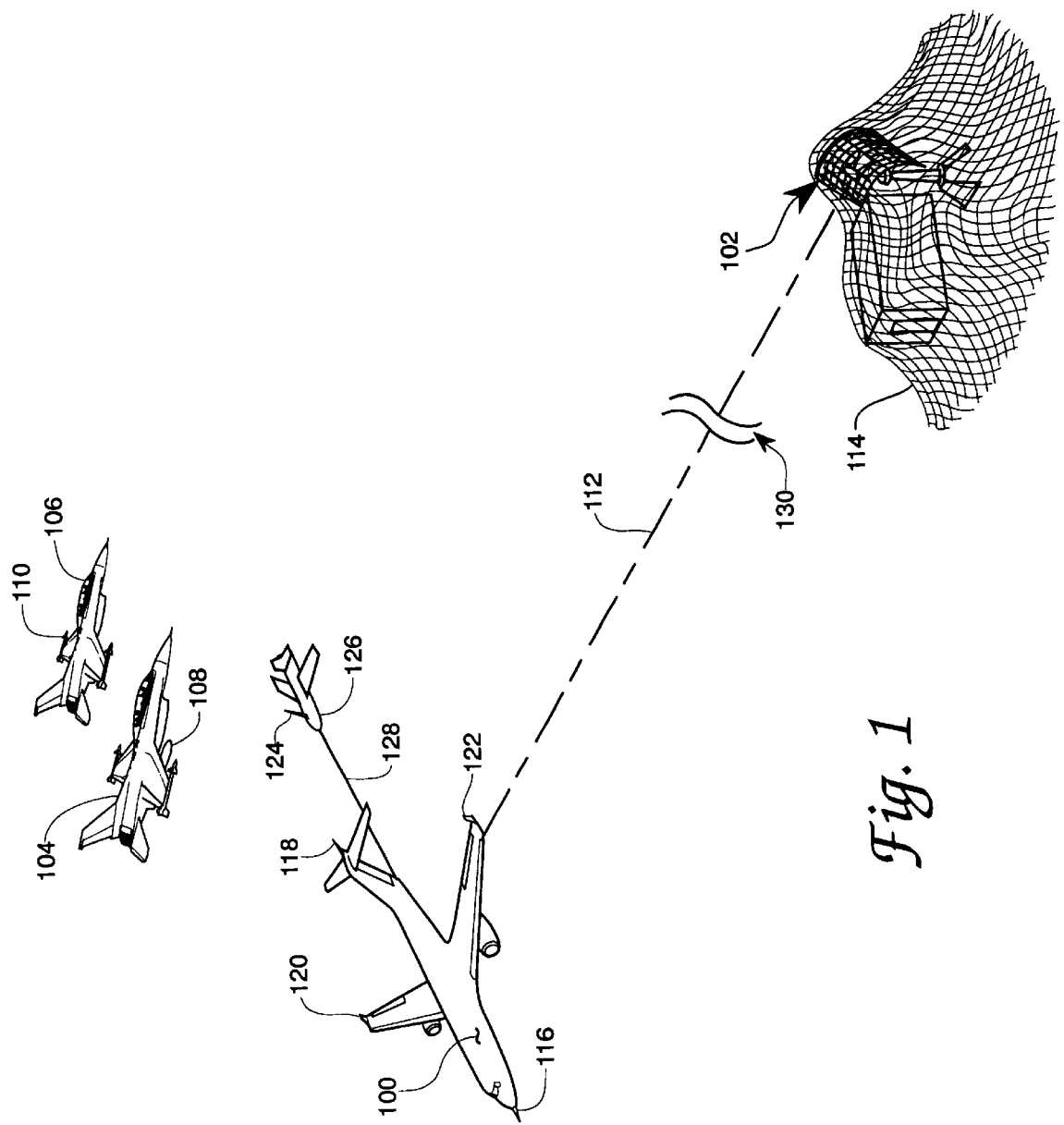
FIG. 1 shows a distant radio frequency energy source locating military scene in which the present invention may be used to advantage.

FIG. 1 in the drawings shows a military environment distant radio frequency energy source locating scene in which the present invention may be used to advantage. In the FIG. 1 scene a search aircraft 100 is shown to be seeking either the relative or the geolocation of an enemy radar site 102 in order that the tactical aircraft represented 104 and 106 may decommission the radar apparatus using, for example, either the gravity responsive munitions devices represented at 108 or rocket assisted munitions devices from the aircraft-carried pods represented at 110. The radar site 102 is presumed located distantly from the search aircraft 100, i.e., at a distance perhaps greater than suggested by the perspective of the FIG. 1 drawing, and is represented to be obscured from visual observation by the camouflage netting 114 or other visual hiding arrangements. The straight line path between the radar site 102 and the search aircraft 100 is represented at 112 in FIG. 1, as indicated by the break symbol 130, path 112 is usually of greater length than appears in the FIG. 1 drawing perspective.

The FIG. 1 search aircraft 100 is represented to have mounted on its peripheral surfaces several omni-directional radio frequency receiving antennas as are indicated by the antenna pairs at 116 and 118 and at 120 and 122 in the drawing. As will become more apparent in later portions of this document these antennas are preferably disposed in such pairs and located at differing extremities of the aircraft 100. These antennas may include one or more additional antennas located below the aircraft 100 in positions not visible in the FIG. 1 drawing. In addition to these aircraft-disposed antennas the present invention radio frequency energy source locating system may also employ one or more other receiving antennas disposed in a long baseline-removed location with respect to the aircraft 100, i.e., disposed on a trailing enclosure 126. The antenna 124 disposed on the enclosure 126 is connected with the aircraft 100 for signal communication purposes by a signal path included in the tether member 128. The tether member 128 may according to present day practices therefore include an electrical signal or an optical signal communicating path in addition to a tensile force-resistant member such as a stranded steel cable.

As will become more apparent in later paragraphs herein the FIG. 1 tether member 128 may be of substantial length with respect to the length of the aircraft 100 in order to obtain a long "baseline" dimension for use in the described time difference of arrival locating system. The tether 128 is, moreover, presumed to be of the type deployed upon command once the aircraft 100 is in flight and may also be of a disposable rather than a retrieved by retraction type. For the present time difference of arrival-based locating of a distant radio frequency energy source a precise knowledge of the signal propagation delay encountered in traversing the tether 128 path is needed and therefore knowledge regarding the effective physical and propagation time length of this path is of great interest. As also discussed below herein the enclosure 126 may contain a radio receiver apparatus or may provide only a passive communication path between the antenna 124 and the aircraft 100. In the latter passive enclosure instance the tether 128 may include a radio frequency signal conveying member such as a coaxial cable rather than a fiber optic communication path. In a related manner the radio frequency receiver, into which electrical signals generated by the antennas of the present invention are communicated, may take the form of either a single receiver with multiple input ports or a plurality of differing receivers each generating an output signal in response to an antenna input signal.

The following additional description of the invention is divided into several "parts". The first of these parts discloses how a large baseline interferometer (of the present invention time difference of arrival configuration) determines angle and range to an emitter. This is a two-dimensional analysis and represents either the azimuth plane or the elevation plane portion of a three dimensional real world system. The second "part" of this description relates to the implementation of a long baseline interferometer. A long baseline interferometer, however, performs an open loop rather than a closed loop measurement and therefore requires some form of calibration and recalibration to maintain measured time and distance accuracy. For example, to achieve a 10 picosecond time measurement accuracy (or an equivalent 0.003 meters distance accuracy) requires the signal transmission paths between two time difference of arrival antennas and their receivers be known generally to within the same 0.003 meters or 3 millimeters signal propagation path length (assuming signal propagation in air and in a transmission line have the same velocity). ($d=C\tau=3\times10^8$ m/s$\times 10\times10^{-12}$S$=30\times10^{-4}$m$=3$ mm)

In practice such 3 millimeter physical dimension accuracy cannot be achieved and maintained in a fixed, non-adjustable system, especially if one of the signal paths involved includes the towline of an aircraft-tethered antenna assembly. Therefore some form of closed loop calibration of an algorithm used to process the time difference of arrival signal data is needed. The third "part" of this description therefore describes the preferred arrangement for such closed loop calibration of a system and its communication paths. For determining geo-location of the unknown source moreover the earth related location of the search platform must be known (and the Global Positioning System may be used for this purpose). If one of the receiver antennas is separated by a tether, then the location of the tethered antenna must also be known. The final "part" of this description, therefore, discloses arrangements by which the tethered antenna can be located and, for example, considers use of an additional long baseline interferometer to locate the tethered antenna. In addition to "parts", the name "case" is used to identify sub topics in several of the following descriptions.

Part I Large Baseline Interferometer Determination of Emitter Angle and Range Two long baseline interferometer arrangements are considered in this part. Arrangement one (case 1) involves a long baseline interferometer oriented orthogonal to its platform velocity and arrangement two (case 2) involves a long baseline interferometer oriented parallel with its platform velocity.

Case One—Interferometer Orthogonal to Platform Velocity

FIG. 3 in the drawings shows an aircraft-disposed large baseline interferometer system having receiver antennas located orthogonal to the aircraft velocity vector. FIG. 3 conditions occur with wing tip-mounted antennas and emitter source locating accomplished in the azimuth plane. In the FIG. 3 drawing the emitter source is presumed located at the point 300 and the interferometer antennas are located at 302 and 304 on either side of the coordinate axis origin 306. The straight line paths between each interferometer antenna and the emission source at point 300 are indicated to have lengths R1 and R2 in FIG. 3, the distance between antennas is indicated as L and the angle θ between a line R connecting the origin 306 with the emission source 300 is indicated at 308. Distances along the horizontal and vertical axes in the FIG. 3 drawing are represented by variables X and Y with the aircraft velocity being in the direction of the Y variable and being identified as $V_y$.

From the FIG. 3 drawing it is possible to obtain the following mathematical relationships:

$$X = R \sin \theta \qquad (1)$$

$$Y = R \cos \theta \qquad (2)$$

$$R_1 = \sqrt{(X - L/2)^2 + Y^2} \qquad (3)$$

$$R_2 = \sqrt{(X + L/2)^2 + Y^2} \qquad (4)$$

$$\text{i TDOA} = (R_2 - R_1)/c \qquad (5)$$

where TDOA represents time difference of arrival i.e., the time interval separating arrival of signals from point 300 at antennas located at 302 and 304 and c represents the speed of light or $3*10^8$ meters/sec.

$$\text{TDOA rate} = \frac{d}{dt}(R_2 - R_1)/c = \frac{V_y}{c}\left(\frac{Y}{R_2} - \frac{Y}{R_1}\right) \qquad (6)$$

The above equations are exact with respect to the FIG. 3 drawing. An approximate equation for $R_2 - R_1$ is:

$$R_2 - R_1 = L \sin \theta. \qquad (7)$$

This approximation is based on $R_1$ and $R_2$ being nearly parallel. From this approximate relationship equations (5) and (6) can be rewritten as follows:

$$TDOA = (L/c) \sin \theta \qquad (8)$$

$$\text{TDOA rate} = \tau' = -0.5 \left(\frac{L}{R}\right)\left(\frac{V_y}{c}\right) \sin(2\theta) \qquad (9)$$

Note from equation (8), that TDOA is a function of angle of arrival (θ) only. That is TDOA is not a function of range. Therefore equation (7) can be solved for angle of arrival.

$$\theta = \sin^{-1}\left(\frac{TDOA * c}{L}\right) \qquad (10)$$

Once the angle of arrival is determined by equation (10) the range to the emission source 300 can be determined by the TDOA rate (τ').

$$\text{Range} = R = -0.5 \left(\frac{L}{\tau'}\right)\left(\frac{V_y}{c}\right) \sin(2\theta) \qquad (11)$$

These equations have been modeled using the software MATLAB (available from The Mathworks, Inc.; see http://mathworks.com) including an error bound on theta (θ) and the TDOA rate (τ'). An example of the results is shown in FIG. 4.

In FIG. 4 a measurement system with no errors may measure a TDOA of 50 nanoseconds and a TDOA rate of 217 picoseconds/second and thereby the emitter would be correctly located at a point 408 in the FIG. 4 drawing (wherein, from FIG. 3, R=50 kilometers and θ=30 degrees.) If, instead, the measurement system incorrectly measured TDOA as 49 nanoseconds it would incorrectly place the emitter angle at line 406 in FIG. 4. Similarly if the measurement system incorrectly measured TDOA as 51 nanoseconds it would incorrectly place the emitter angle at line 404 in FIG. 4. The angular wedge bounded by lines 406 and 404 in FIG. 4 therefore represents the location bound of a system with ±1 nanosecond measurement accuracy. Similarly the curved boundaries 402 and 400 represent the error boundaries for measurement accuracies of ±10 picoseconds/second for the TDOA rate. The rectilinear wedge defined by the intersection of lines 404 and 406 and the error contours 400 and 402 in FIG. 4 therefore shows the possible location of the point 408 with measurement errors of ±1 nsec for the TDOA and ±10 psec/sec for the TDOA rate. FIG. 4 is thus an example of results that may be obtained using the present invention.

Case Two—Interferometer Parallel to Platform Velocity

Figure 5:
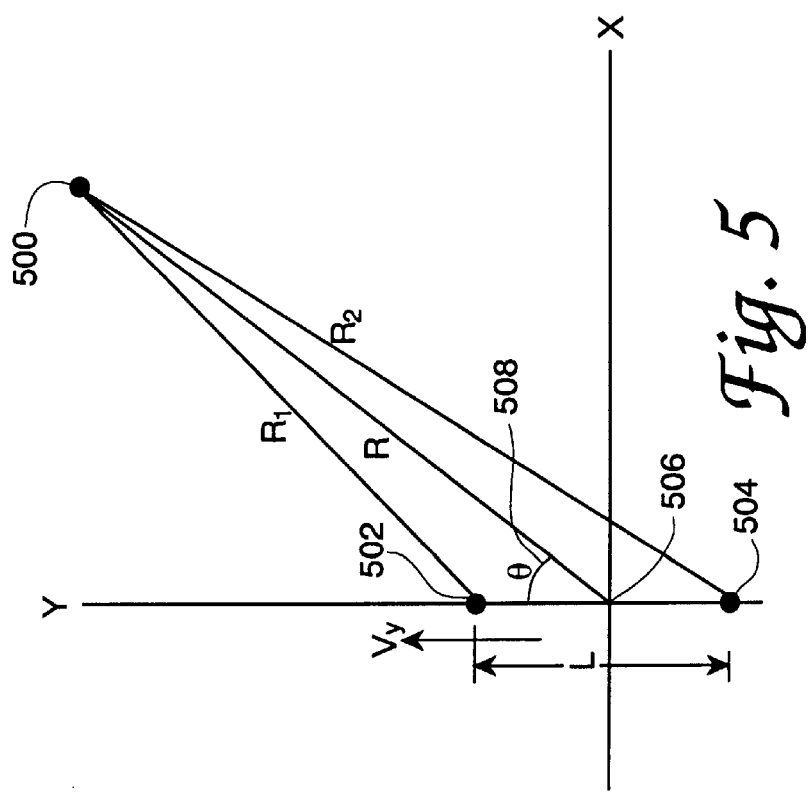
FIG. 5 shows geometric relationships applicable to the radio frequency signals in a second arrangement of the present invention.

FIG. 5 in the drawings shows another aircraft-disposed large baseline interferometer, an interferometer having receiver antennas located parallel with the aircraft velocity vector. The FIG. 5 interferometer configuration is relevant to aircraft nose and tail-mounted antennas and emitter source locating accomplished in the azimuth plane. In the FIG. 5 drawing the emitter source is presumed located at the point 500 and the interferometer antennas are located at 502 and 504 above and below the coordinate axis origin 506. The straight line paths between each interferometer antenna and the emission source at point 500 are indicated to have lengths R1 and R2 in FIG. 5, the front to back distance between antennas is identified as L and the angle θ between the line R connecting the origin 506 with the emission source 500 is indicated at 508. Distances along the horizontal and vertical axes in the FIG. 5 drawing are again represented by variables X and Y with the aircraft velocity being in the direction of the Y variable and being identified as $V_y$.

In the manner of the above arrangement 1 analysis, from the FIG. 5 drawing it is possible to verify the following mathematical relationships:

$$X = R \sin\theta \tag{12}$$

$$Y = R \cos\theta \tag{13}$$

$$R_1 = \sqrt{X^2 + (Y - L/2)^2} \tag{14}$$

$$R_2 = \sqrt{X^2 + (Y + L/2)^2} \tag{15}$$

$$TDOA = (R_2 - R_1)/c \tag{16}$$

Where c=speed of light=$3*10^8$ meters/sec $$TDOA\ \text{rate} = \frac{d}{dt}(R_2 - R_1)/c = \frac{V_y}{c}\left(\frac{Y+L/2}{R_2} - \frac{Y-L/2}{R_1}\right) \tag{17}$$

The above equations are exact. The following equations are approximate assuming $R_1$ and $R_2$ are parallel.

$$R_2 - R_1 = L \cos\theta \tag{18}$$

$$TDOA = (L/c) \cos\theta \tag{19}$$

$$TDOA\ \text{rate} = \tau' = \left(\frac{L}{R}\right)\left(\frac{V_y}{c}\right)\sin^2\theta \tag{20}$$

Note from equation (19), that TDOA is a function of angle of arrival (θ) only. That is it is not a function of range. Therefore equation (19) can be solved for angle of arrival.

$$\theta = \cos^{-1}\left(\frac{TDOA*c}{L}\right) \tag{21}$$

Once the angle of arrival is determined by equation (21) the range can be determined by the TDOA rate (τ').

$$\text{Range} = R = \left(\frac{L}{\tau'}\right)\left(\frac{V_y}{c}\right)\sin^2\theta \tag{22}$$

Figure 6:
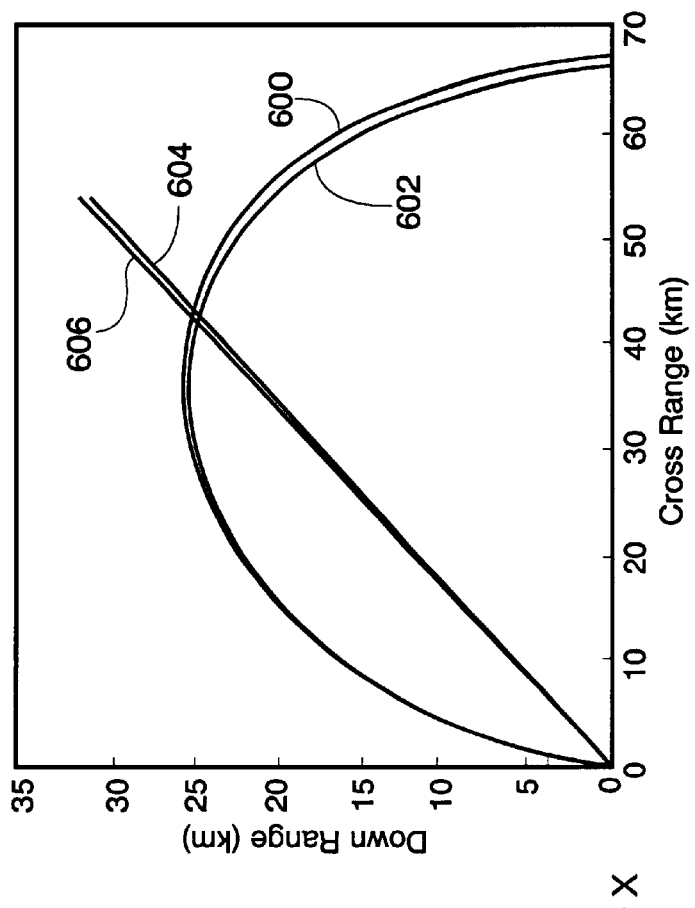
FIG. 6 shows a family of time and angle error curves relating to the FIG. 5 geometric relationships and their attending mathematical equations.

These equations have also been modeled in MATLAB with an error bound on theta (θ) and the TDOA rate (τ'). An example of the FIG. 4 type for the results of this modeling is shown in FIG. 6. In the FIG. 6 drawing the angle of the line 604 represents a measurement error of ±1 nanosecond (i.e., a measured value of 168 nanoseconds instead of 167 nanoseconds) and the angle of the line 606 represents a measurement error of −1 nanosecond. Similarly the curved contours 600 and 602 represent τ' measurement errors of −10 picoseconds and +10 picoseconds respectively. Also for the FIG. 6 example L=100 meters, Range=50 km, Velocity= 250 m/sec, and the emitter angle is at 60 degrees. The correct value for the TDOA rate in FIG. 6 is 1250 picoseconds/ second and the correct value for TDOA is 167 nanoseconds. FIG. 6 thus shows the error bounds with a TDOA measurement error of ±1 nsec and a TDOA rate measurement error of ±10 picoseconds/sec.

In either of the present interferometer parallel or perpendicular to platform velocity settings Equation (10) gives the Azimuth angle if the aircraft is flying straight and level and the elevation angle if the aircraft is rolled 90°. Also note that equation (21) is roll symmetric.

Part II Large Baseline Interferometer Implementations

Case 1 —Analog Interferometer with Video Receiver

Figure 7:
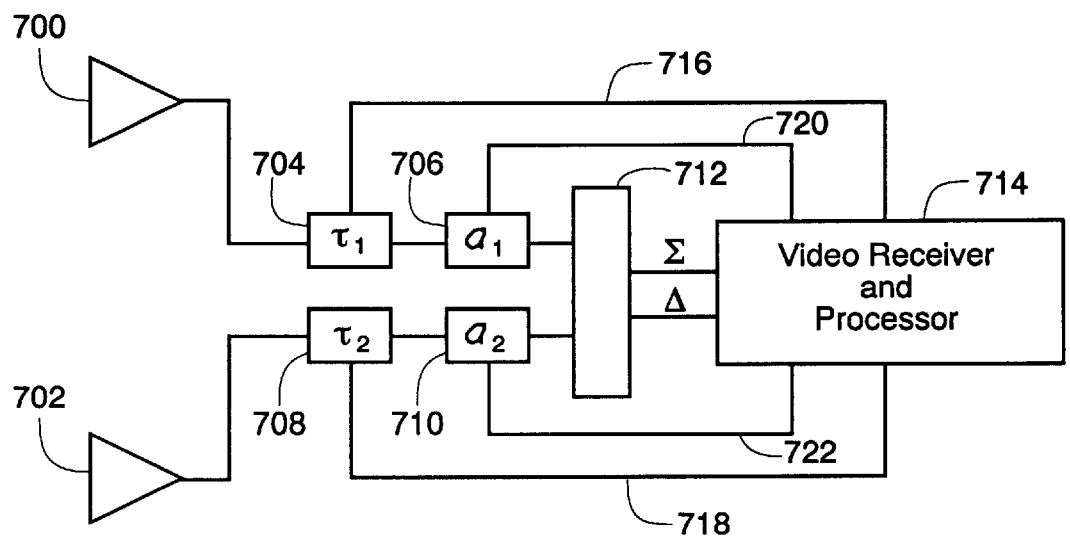
FIG. 7 shows one arrangement of a time difference of arrival-responsive locator system according to the present invention.

FIG. 7 in the drawings shows a diagram of an analog long baseline interferometer for measuring time difference of arrival and time difference of arrival rate using the preceding mathematical relationships. The FIG. 7 measurements are accomplished using a null seeking method. In the FIG. 7 apparatus signals from the long baseline separated antennas 700 and 702 are coupled to the adjustable time delay elements $\tau_1$, $\tau_2$ at 704 and 708 and thence to the adjustable attenuators $\alpha_1$, $\alpha_2$ at 706, 710. Output from the attenuators $\alpha_1$, $\alpha_2$ is connected to the hybrid at 712 for generation of the Σ and Δ signals applied to the video receiver and processor 714. The bipolar video in the FIG. 7 sum or Σ channel and delta or Δ channel is sampled in the wide band receiver 714 near the center of the received pulses. Controls signals for selecting values of time delay and attenuation are generated in the receiver and processor 714 and fed back to the time delay and attenuators along the paths 716, 718 and 720, 722 respectively. These signals are generated in accordance with iterative mathematical equations and adjust attenuators ($\alpha_1$, $\alpha_2$) and time delays ($\tau_1$, $\tau_2$) to obtain a null at the Δ port of the hybrid 712.

There are many ambiguities in the value of the FIG. 7 delay τ because there are many radio frequency wavelengths present in a receiver input pulse. There is, however, only one value of $\tau_2-\tau_1$ that will eliminate the ears (i.e., the leading and trailing edge spikes) occurring when two out-of-phase received pulses do not overlap exactly. This value of time difference of arrival=$\tau_2-\tau_1$ can be found by further filtering the signal through a narrow band filter in the video receiver and processor 714 to stretch the ears so they also can be measured. The time delay devices 704 and 708 may be implemented at the frequency of the signal involved using waveguide or coaxial cable. Other implementing approaches include use of a tapped acoustic delay line or use of a switched fiber optic delay line. The following Table 1 shows the number of bits needed and the delay time for each bit for a tapped analog delay line (of these or other types) used in the FIG. 7 apparatus. The delay values are expressed in nanoseconds. As can be seen 14 bits are needed to obtain resolution of a representative 125 picoseconds time difference of arrival interval.

TABLE 1

| Bit value in ns | .125 | .25 | .5 | 1 | 2 | 4 | 8 | 16 | 32 | 64 | 128 | 256 | 512 | 1024 |
|---|---|---|---|---|---|---|---|---|---|---|---|---|---|---|
| Bit number | 1 | 2 | 3 | 4 | 5 | 6 | 7 | 9 | 9 | 10 | 11 | 12 | 13 | 14 |

The FIG. 7 analog approach to time difference of arrival measurement using this relatively long and tapped delay line becomes somewhat bulky in physical size. Note also that the FIG. 7 implementation is not self-calibrating. To add self-calibration to this system would result in an even more complex and bulky apparatus. An improved approach is disclosed in the Case 2 hybrid analog/digital interferometer arrangement described below. In case 2 a self-calibration arrangement has also been added.

Case 2—Hybrid Analog/Digital Interferometer

Figure 8:
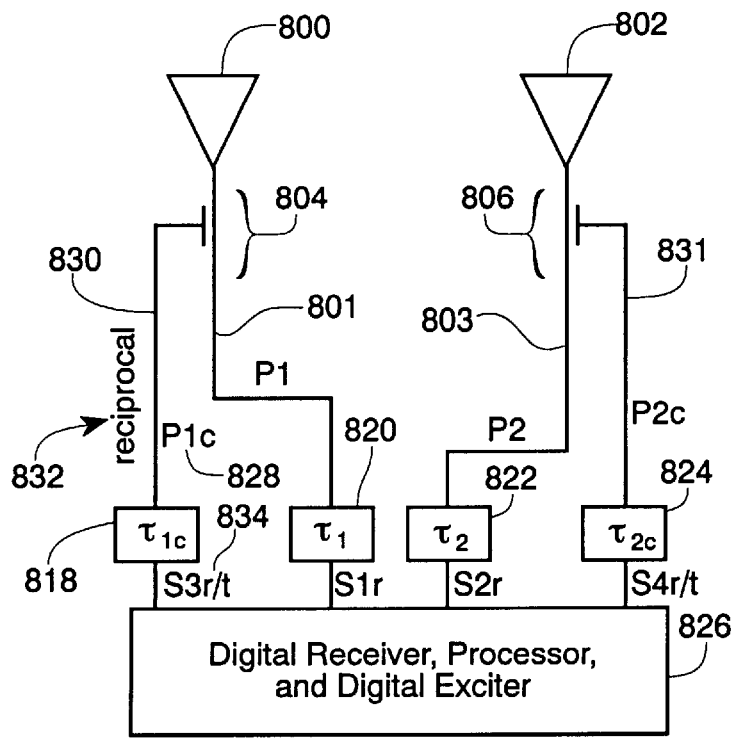
FIG. 8 shows another arrangement of a time difference of arrival-responsive locator system according to the present invention.

FIG. 8 and FIG. 10 in the drawings each show a combination analog and digital hybrid arrangement of a time difference of arrival interferometer in which the fine grain time delay elements are implemented in analog form and the larger time delays are determined by a radio frequency signal receiver (or receivers) that are digital in nature. The FIGS. 8 and 10 interferometers are useful in the present document for both describing the benefits achieved with a hybrid interferometer and also as examples of a present invention interferometer installed on an aircraft and its calibration. The aircraft and calibration aspects of these FIGS. 8 and 10 interferometers is discussed in the subsequent topics herein; the hybrid interferometer aspects are considered in the immediately following paragraphs below.

Using a digital receiver in the FIGS. 8 and 10 interferometers significantly reduces the number of bits required in the analog delay lines from that of the FIG. 7 interferometer because the time interval between receiver signal sampling events is accurately known. In the FIGS. 8 and 10 interferometers the largest delay line bit used need only be of a duration as large as the time between signal samples in the digital receiver. For a sample frequency of 50 MHz, for example, this time between samples is 20 nanoseconds. For a 500 MHz sample frequency the time between samples is 2 nanoseconds. Additionally in the FIGS. 8 and 10 interferometers the smallest bit can be reduced in time significance. The digital samples in the FIGS. 8 and 10 interferometers include both in phase (I) and quadrant (Q) samples. Therefore the phase between the two signals can be calculated. Also the signal frequency can be determined so the phase relationships can be converted to a time delay significance. Therefore analog delay bits below one wavelength are not needed.

In the FIGS. 8 and 10 interferometers at 20 GHz one wavelength corresponds to 50 picoseconds of propagation time. The values and number of bits or the analog variable time delay using this 50 MHz sample rate and a maximum radio frequency input of 20 GHz are given in the Table 2 below. The Table 2 bit values are in nanoseconds. The number of bits is not only reduced in Table 2 with respect to Table 1 but the resolution in Table 2 is also increased. The maximum bit length in Table 2 is also reduced from 1024 nanoseconds to 12.8 nanoseconds.

TABLE 2

| bit value | .025 | .05 | .1 | .2 | .4 | .8 | 1.6 | 3.2 | 6.4 | 12.8 |
|---|---|---|---|---|---|---|---|---|---|---|
| index # | 1 | 2 | 3 | 4 | 5 | 6 | 7 | 8 | 9 | 10 |

Part III Long Baseline Interferometer Calibration

When reduced to the fundamental concepts involved, each of the FIGS. 8 and 10 interferometers (i.e., the interferometers discussed as arrangements 1 and 2 in the present topic of this specification) performs emitter location by way of measuring the time delay between a signal arriving at a first and at a second receiver antenna; that is, the interferometer discerns the difference in signal propagation time to two physically separated points. For such measurements time resolutions quantified into picoseconds of time are needed together with measurement stabilities of comparable or better than this picoseconds resolution. Since maintenance of such measurement accuracy in a fixed reference or an open loop measurement apparatus is difficult at best or bordering the impractical because of system variations encountered, it is desirable in the present invention to use a closed loop or self calibrated measurement algorithm for maintaining needed measurement accuracy under real world conditions. In the case of a long baseline interferometer completely mounted on an aircraft recalibration in this manner is readily accomplished.

Long Baseline Interferometer Calibration, Arrangement 1

The FIG. 8 interferometer may be considered as an example of an aircraft mounted interferometer emitter locating apparatus, in this FIG. 8 system signals from the distant radio frequency emitter are received at the antennas 800 and 802 and communicated to the digital receiver 826 along the paths 801 and 803, the paths identified as P1 and P2 in the FIG. 8 drawing. Included in the paths 801 and 803 are the signal coupling elements at 804 and 806 which are abbreviated and drawing simplified representations of the structure shown in FIG. 2 of the drawings.

Figure 2:
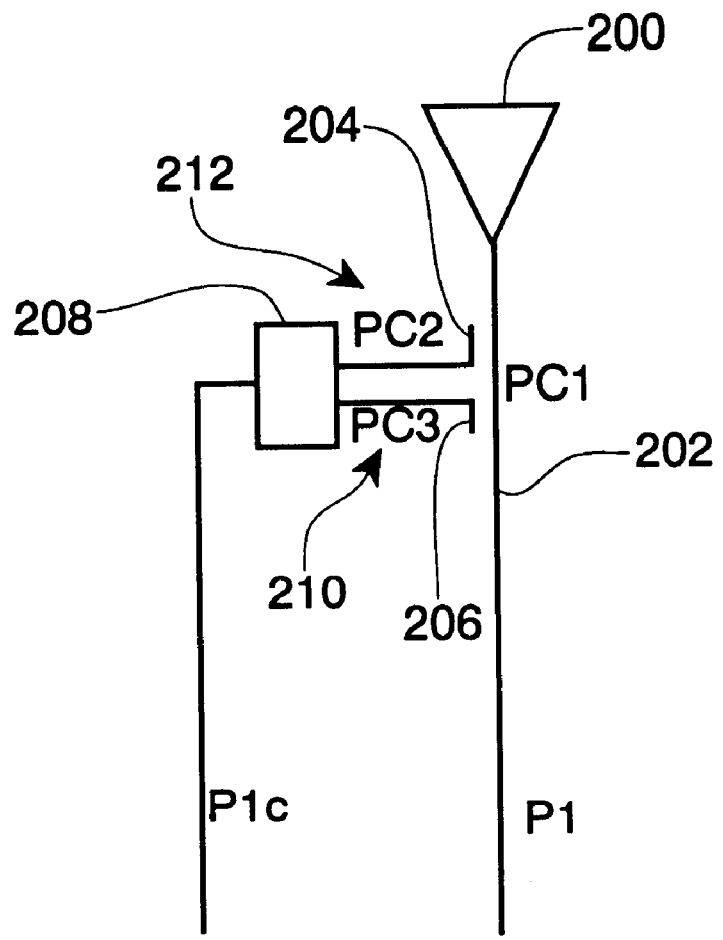
FIG. 2 shows a power splitter and bi-directional signal coupler apparatus usable in embodying the present invention.

In the FIG. 2 drawing the bi-directional power splitter and bi-directional couplers represented at 804, for example in FIG. 8, are shown to be comprised of one coupling element 204 to couple a received signal from antenna 200 to path P1c through path Pc2 and one coupling element 206 to couple a transmitted signal from path P1c to path P1 through path Pc3. Additionally, a signal from antenna 200 is coupled to path P1 through path Pc1. These three coupling paths are needed in order to write the time delay equations (23) through (27) shown below. Since the FIG. 2 coupling arrangement is arranged such that Pc2 is equal to Pc3 these two paths can be eliminated in the equations (23) through (27).

Returning now to FIG. 8, the signal delays occurring along paths 801 and 803, and any changes in these delays from temperature influences and the like, are of course inseparable from the genuine time difference of arrival in signals from the energy source being located during signal processing in the receiver 826. Therefore, adjustment of the time difference of arrival-determining algorithm in the receiver 826, according to the encountered delays in these paths and their changes, must be accomplished in order to maintain locating accuracy of the FIG. 8 interferometer. Notably the delays at blocks 818 and 824 in the FIG. 8 system are reciprocal in nature and are, therefore, delays requiring more bulky realization apparatus. The clock to clock time interval-resolving delay lines at 820 and 822 in FIG. 8 are helpful in resolving the delay intervals between clock pulses of the FIG. 8 system and thereby increase the accuracy with which time difference of arrival values may be measured.

Signal delays occurring in the paths 801 and 803 and delays encountered in the reciprocal calibration signal paths 830 and 831 paralleling the paths 801 and 803 may be considered mathematically by way of the following time delay equations. In the first of these equations, for example, it is considered that an unknown signal S1u has been received at the antenna 800 and subsequently the signals S1r and S3r are received:

$$S1u+Pc1+P1+\tau_1=S1r \text{ (note that Pc1 appears in FIG. 2)} \quad (23)$$

$$S1u+P1c+\tau_{1c}=S3r \quad (24)$$

Subtracting equation 23 from equation 24 gives:

$$P1c-P1=S3r-S1r+Pc1+\tau_1-\tau_{1c} \quad (25)$$

Note in FIG. 8 and equation (25) that both $\tau_1$ and $\tau_{1c}$ are adjustment verniers (e.g. tapped analog delay lines of overall time interval equal to the system clock interval) enabling time of arrival determination at S3r and S1r. These verniers resolve the ambiguities of the multiple wavelengths within the receiver clock steps.

Then injecting a signal into path P1, 801 via the reciprocal path P1c, 830 gives:

$$S3t+T_{1c}+P1c+P1+\tau_1=S1r \quad (26)$$

which can be rewritten as:

$$P1c+P1=S1r-S3t-\tau_1-\tau_{1c} \quad (27)$$

Equations 25 and 27 are independent because the value of their determinant is non zero.

$$\begin{vmatrix} 1 & -1 \\ 1 & 1 \end{vmatrix} = 2$$

Therefore, these equations can be solved for P1 and P1c.

In the other FIG. 8 path, path P2, 831, P2 and P2c can be calibrated following the same procedure as for path 1.

Long Baseline Interferometer Calibration, Arrangement 2

A long baseline interferometer calibration approach requiring no reciprocal variable delay line and only two non-reciprocal analog variable delay lines is shown in FIG. 10 of the drawings. In FIG. 10, P15 represents the path length from the antenna 1000 phase center to the first coupler 1002 and P16 represents the path length from the first coupler 1002 to the second coupler 1004. These P15 and P16 path lengths are relatively short, rigid and fixed and therefore may be factory calibrated. These path lengths may, however, vary with temperature, therefore a temperature sensing element such as a thermocouple may be added to this portion of the FIG. 10 apparatus to measure its effective temperature. With such measurement the precise value of P15 and P16 delay time can be determined from a temperature versus path length table. The remaining paths associated with the antenna 1000, the paths P11, P12, and P13 are calibrated during operation of the FIG. 10 system.

Note that directional couplers 1004 and 1005 in FIG. 10 couple in both directions and are represented by FIG. 2. For simplification the path Pc1 is omitted; that is, it is assumed to be zero. The Pc1 term can, however, be easily added into the equations for the final determinations of the paths if desired. Also Pc2 and Pc3 are not included in the equations but since they are equal they are incorporated into FIG. 10 path P12.

In the FIG. 10 apparatus a signal from the emission source to be located is received at the antennas 1000 and 1008 and communicated through the delay-inclusive paths at P11 and P21 to two different inputs of the digital receiver, processor and digital exciter 1010. In the delay-inclusive paths at P11 and P21 the analog delay elements at 1006 and 1007 provide time/emitter-location resolution within the interval defined by two adjacent system clocks; this is accomplished by the steps of table 2. The paths P13 and P23 in the FIG. 10 apparatus are bi-directional and reciprocal paths by which calibration signals from the digital exciter portion of the digital receiver, processor and digital exciter 1010 are communicated into the S1r and S2r receiver input paths by way of the couplers 1002 and 1003 during the calibration portion (i.e., during a transmit or (t) operation of the indicated S31r/t signal communication) of a FIG. 10 system operating cycle. During the receive (r) portion of this S31r/t signal communication in a system operating cycle the path P13 provides reception of the S1t signal to the S31r input. The paths P12 and P22 in the FIG. 10 time difference of arrival interferometer and their associated couplers 1004 and 1005 provide a signal to S1r and S2r respectively. The paths P12 and P22 in the FIG. 10 time difference of arrival interferometer and their associated couplers 1004 and 1005 also provide a signal to the S31r and S32r inputs of the digital receiver, processor and digital exciter 1010.

By inspection of the FIG. 10 long baseline interferometer the following independent time delay equations can be written. For initial calibration $\tau_1$ can be set to zero; therefore $\tau_1$ does not appear in the following equations.

$$S1t+P12+P11=S1r \quad (28)$$

$$S1t+P12+P16+P13=S31r \quad (29)$$

$$S31t+P13+P16+P11=S1r \quad (30)$$

To show that these three equations are independent they can be rewritten in matrix form and the resulting determinant calculated. The matrix equation (equation 31) follows.

$$\begin{bmatrix} 1 & 1 & 0 \\ 0 & 1 & 1 \\ 1 & 0 & 1 \end{bmatrix} \begin{bmatrix} P11 \\ P12 \\ P13 \end{bmatrix} = \begin{bmatrix} S1r-S1t \\ S31r-S1t-P16 \\ S1r-S31t-P16 \end{bmatrix} \quad (31)$$

The value of this determinant is 2; therefore the three equations are independent and can be solved. The receive path P11 has now been calibrated with $\tau_1$ set to zero.

The FIG. 10 paths for antenna 2 at 1008, paths P21, P22 and P23 can be calibrated following the above same procedure as described for antenna 1. The resolution of the time difference of arrival at the digital receiver is, however, limited by the resolution of the clock steps. The time delays $\tau_1$ and $\tau_2$ can be adjusted to increase this resolution by aligning the envelopes of the two received pulses.

Now if path P15+P16+P11 is equal to P25+P26+P21 the time difference of arrival measured between S1r and S2r is the same as the time difference of arrival at the antenna A1 and A2. Therefore the emitter is located relative to the two antennas. Since P11 and P12 have been calibrated (i.e., their time delay measured) and P15, P16, P25, and P26 are known, the time difference of arrival measured at the digital receiver can be used to determine the time difference of arrival at the antennas.

In FIG. 10 note that A1 represents an assembly inclusive of antenna 1. That is the two couplers at 1002 and 1004 are built into the antenna assembly in the factory and the whole assembly is calibrated there and delivered with a calibration table. If any part of the A1 assembly fails the entire assembly is replaced as a unit and the calibration table for the new unit is loaded into the digital processor of the digital receiver, processor and digital exciter 1010.

Digital Receiver, Processor, and Digital Exciter (DRPE)

Some discussion of the Digital Receiver, Processor, and Digital Exciter shown, for example, at 1010 in FIG. 10 may be helpful in appreciating the present invention. Of initial interest in this discussion is the reciprocal nature and calibration aspects of the Digital Receiver, Processor, and Digital Exciter 1010. A truly reciprocal receiver transmitter for the S31r/t and S32r/t function can be fabricated using an analog approach as depicted in the FIG. 7 drawing herein. Inclusion of the FIG. 7 analog apparatus in the Digital Receiver, Processor, and Digital Exciter 1010, however, distracts from the overall intent of a digital system. Inclusion of a FIG. 7 analog subsystem in Digital Receiver, Processor, and Digital Exciter 1010 would result in a hybrid analog/digital system and incur the disadvantages described in connection with FIG. 7, for example. An all digital approach is, therefore, shown in FIG. 11 of the drawings.

Figure 11:
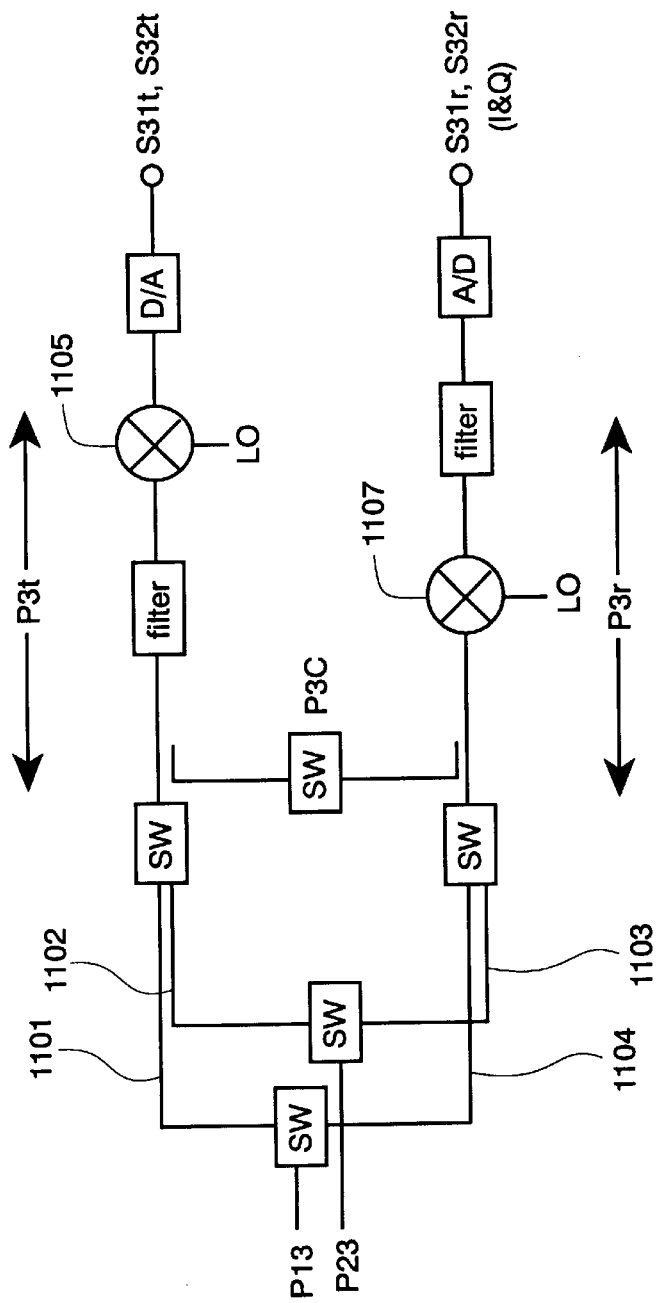
FIG. 11 shows a bi-directional digital receiver and exciter according the present invention.

Before discussing the FIG. 11 Digital Receiver, Processor, and Digital Exciter a consideration of the included subsystem apparatus shown in FIG. 9 may also be helpful. The FIG. 9a and FIG. 9b views in FIG. 9 represent receiver and exciter portions of the Digital Receiver, Processor, and Digital Exciter at 1010 in FIG. 10 respectively. In the FIG. 9a receiver a radio frequency signal is input to the mixer 901 which down converts the signal to an intermediate frequency signal. This intermediate frequency signal has two sidebands. Only one sideband passes through the filter 902 and this sideband is converted to digital samples by the analog to digital converter 903. A single stage of down conversion is shown but multiple stages can be used. As indicated by the signal labels at the input path of mixer 901 in FIG. 9a, connection and disposition of the FIG. 9a receiver within the Digital Receiver, Processor, and Digital Exciter 1010 of FIG. 10 is to receive the delayed analog signals from blocks 1006 and 1007 respectively. The output of the two FIG. 9a receivers included in block 1010 is a digitized version of the received S1r and S2r signals as indicated in FIG. 9a.

In a similar manner in the FIG. 9b exciter digital signal samples representing a digital version of one of the signals S1t and S2t are fed into the digital to analog converter 904 then mixed up to radio frequency by the mixer 906 and finally filtered in the filter 905 to eliminate one of the mixing-produced sidebands. A single state of up-conversion is shown but multiple stages can be used. The output signal from the filter 905 is, as indicated by the labels in FIG. 9a, the analog signal fed to respective of the signal couplers 1004 and 1005 in the FIG. 10 Digital Receiver, Processor, and Digital Exciter. The FIG. 9 subsystems are believed, therefore, to come within the capability of persons skilled in the electronic art.

With this discussion of the FIG. 9 subsystems in mind a consideration of additional portions of the Digital Receiver, Processor, and Digital Exciter 1010 in FIG. 10 is possible. This involves the apparatus and the signals associated with the reciprocal paths characterized by signal delays P13 and P23 in the FIG. 10 system; the signals S31r/t and S32r/t. In order to better appreciate several aspects of this apparatus and these signals the subsystem of FIG. 11 and the separated receive and transmit signal paths P3t and P3r shown there may be considered as follows.

In this discussion it is perhaps helpful to appreciate that an overall consideration in the present invention is to obtain precise knowledge of how the delays P11 and P21 in the FIG. 10 behave in the real world environment of a present invention time difference of arrival interferometer. This knowledge is obtained in the present invention by way of calibration signals developed in the Digital Receiver, Processor, and Digital Exciter 1010 of FIG. 10; i.e., by way of inserting these calibration signals into the signal paths characterized by delays P11 and P21 in FIG. 10 using the couplers at 1002 and 1003, for example. In such real world conditions however it must be remembered that the paths conveying these calibration signals to their physical point of insertion in the FIG. 10 system (e.g. the paths characterized by the FIG. 10 delays P13 and P23 for example) are also characterized by delays and delay changes which must be considered in the calibration process—and in the time delay equations used herein to describe the system and its calibration. In view of these considerations the following discussion of the FIG. 10 Digital Receiver, Processor, and Digital Exciter and its subsystem shown in FIG. 11 involves a combination of the delay terms P13, P23, P11 and P21 and the equations using these terms. With such calibration accomplished, signal timings measured at a receiver become useful in determining actual signal timing relationships occurring at an antenna or antennas; without such calibration, delays between antenna signals and measured signals make a time difference of arrival interferometer difficult to accomplish. Delay variations of course compound this difficulty.

In the FIG. 10-related equation (29) the delay P13 includes the delays shown in path P3r appearing in the FIG. 11 drawing. Similarly in equation (30) the delay P13 includes the delays shown in path P3t of FIG. 11. Therefore the delay term P13 is the same unknown in the two equations (29) and (30) only if delays P3t and P3r are equal. The delay differences between paths P3t and P3r in FIG. 11 can be made small during the manufacturing process and may remain small during the subsequent deployment of the present invention interferometer and its Digital Receiver, Processor, and Digital Exciter. For consistency of the calibration it is assumed that short passive paths remain constant or vary in a know manner with temperature. A mixer as shown at 1105 and 1107 in FIG. 11 is, however, not passive. Also the mixing process is usually lossy and is, therefore, followed by an amplifier not shown in FIG. 9 or FIG. 11. Again such an amplifier is not passive. Therefore, for completeness it is assumed that P3t is not equal to P3r and the error this produces in paths P11 and P21 is determined by the disclosed equations.

Long Baseline Interferometer Expanded Calibration, Arrangement 2

By inspection of FIG. 10 and FIG. 11 the time delay equations (32) through (34) can be written in the form of:

$$S1t+P12+P11=S1r \quad (32)$$

$$S1t+P12+P16+P13+P3r=S31r \quad (33)$$

$$S31t+P3t+P13+P16+P11=S1r \quad (34)$$

Note that the P13 in equations (33) and (34) is not the same P13 in equations (29) and (30); this is because the P3r and P3t paths have been assumed non equal and removed from inclusion as part of P13. Also for these equations it is assumed that paths 1101 and 1104 in the FIG. 11 subsystem are equal and part of P13. Rewriting equations (32) through (34) in matrix form gives.

$$\begin{bmatrix} 1 & 1 & 0 \\ 0 & 1 & 1 \\ 1 & 0 & 1 \end{bmatrix} \begin{bmatrix} P11 \\ P12 \\ P13 \end{bmatrix} = \begin{bmatrix} S1r-S1t \\ S31r-S1t-P16-P3r \\ S1r-S31t-P16-P3t \end{bmatrix} \quad (35)$$

Equation (35) can be solved for the terms P11, P12, P13, i.e., for the delays of these paths, assuming P3r and P3t are known. The result is given below.

$$\begin{bmatrix} P11 \\ P12 \\ P13 \end{bmatrix} = \begin{bmatrix} .5 & -.5 & .5 \\ .5 & .5 & -.5 \\ -.5 & .5 & .5 \end{bmatrix} \begin{bmatrix} S1r1t \\ S31r1t-P16-P3r \\ S1r31t-P16-P3t \end{bmatrix} \quad (36)$$

Where the simplifying notation S1r1t=S1r−S1t, S31r1t=S31r−S1t, and S1r31t=S1r−S31t has been applied. This notation is also applied to emphasize that S1r in equation (32) is not the same S1r in equation (34) but rather that S1r−S1t is a propagation time, or a delay time, around the path P11+P12.

Now expanding equation (36) the time delay of the three paths can be written as $$P11=0.5 \ (S1r1t-S31r1t+S1r31t)+0.5 \ (P3r-P3t) \quad (37)$$

$$P12=0.5 \ (S1r1t+S31r1t-S1r31t)-0.5 \ (P3r-P3t) \quad (38)$$

$$P13=0.5 \ (-S1r1t+S31r1t+S1r31t)-P16-0.5 \ (P3r+P3t) \quad (39)$$

At this point it may be observed that if P3r=P3t it does not matter what values they are in the determination of P11. If P3r and P3t both increase the same amount during system operation and warm up then P11 is still determined correctly.

By symmetry of FIG. 10

$$P21=0.5 \ (S2r2t-S32r2t+S2r32t)+0.5 \ (P3r-P3t) \quad (40)$$

and the above observation for P11 also applies to P21.

Also it may be observed from FIG. 11 that $$S31t+P3t+P3c+P3r=S31r \quad (41)$$

Equation (41) can be solved for P3t+P3r.
The result is:

$$P3t+P3r=S31r-S31t-P3c \quad (42)$$

Therefore, P13 in equation (39) can be determined since S31r31t=S31r−S31t is a measured time delay and P3c is a short passive known delay that can be monitored for temperature.

It has been shown that path P13 and by similarity path P23 can be determined by calibration. This is true to the extent that P16 and P3c are known. Also referring back to FIG. 2, Pc1 must also be known.

The question then arises can P11 be determined? An approach to consider this question is to write the following equations:

$$S1U+P15+P13+P3r=S31r \quad (43)$$

$$S1U+P15+P16+P11=S1r \quad (44)$$

where S1U is a received signal of unknown time of arrival and P15 is the path from the antenna to the coupler 1002. Subtracting equation (43) from (44) gives $$P11+P16-P13-P3r=S1r-S31r \quad (45)$$

Solving this for P11 gives $$P11=S1r31r-P16+P13+P3r \quad (46)$$

It may, therefore, be observed that PI I is not determined unless P3r is known exactly. While P16 and P13 are known, any error in P3r will be an error in determining P11. P3r is not a passive device. The accuracy of P11 depends on the accuracy of P3r and this may be sufficient for most applications. The additional analysis below shows that any error in P3r does not contribute to an error in the determination of TDOA.

By analogy with the derivation of equation (46) the following equation can be derived.

$$P21=S2r32r-P26+P23+P3r \quad (47)$$

The same observation for equation (46) applies to equation (47). Note that any error in P3r produces an error in P21. Further note that any error in P3r produces the same error in P11 and P21.

Now let a signal arrive at antenna 1000 and 1008. The signals are respectively S1U and S2U. The TDOA is S1U−S2U. The TDOAM at the S1 and S2 receiver is (with the "m" subscript indicating "measured" at the receiver):

$$TDOA_m=S1_m-S2_m=S1U+P15+P16+P11-(S2U+P25+P26+P21) \quad (48a)$$

$$TDOA_m=S1U-S2U+(P11-P21)+(P15-P25)+(P16-P26) \quad (48b)$$

Since P11−P21=S1r31r−P16+P13−P3r−(S2r32r−P26+P23−P3r) (48c)

the value of P3r cancels and P11−P12 is determined since all the other terms are known. That is:

$$P11-P21=S1r31r-S2r32r-(P16-P26)+(P13-P23) \quad (48d)$$

Now solving equation (48b) for S1−S2U which is the desired TDOA gives:

$$TDOA=S1U-S2U=TDOA_M-(P11-P21)-(P15-P25)-(P16-P26) \quad (49)$$

Therefore, TDOA can be correctly determined without knowing whether P3r contains an error or not.

Part IV Calibration of Tethered Antenna Long Baseline Interferometer

If one of the interferometer receiver antennas is located on a tethered antenna assembly in order to achieve the accuracy benefits of a longer baseline, for example, the self-calibration of the interferometer is more complex. The use of fiber optics links between the aircraft and the tethered antenna and the fact that fiber optic links are not reciprocal, i.e., the transducer for converting radio frequency signals into fiber optic signals is usually not a bi-directional signal device, provides one prominent source of this additional complexity. One could make a pseudo reciprocal fiber optic link but for high accuracy this would require a calibration system at each end of the fiber optic link. The present invention eliminates the requirement to have a calibration system (i.e., a processor) at the tethered antenna. This is beneficial because a tethered antenna assembly is often an expendable item (i.e., is cut-loose rather than reeled-in after use) in some military interferometer applications.

Figure 12:
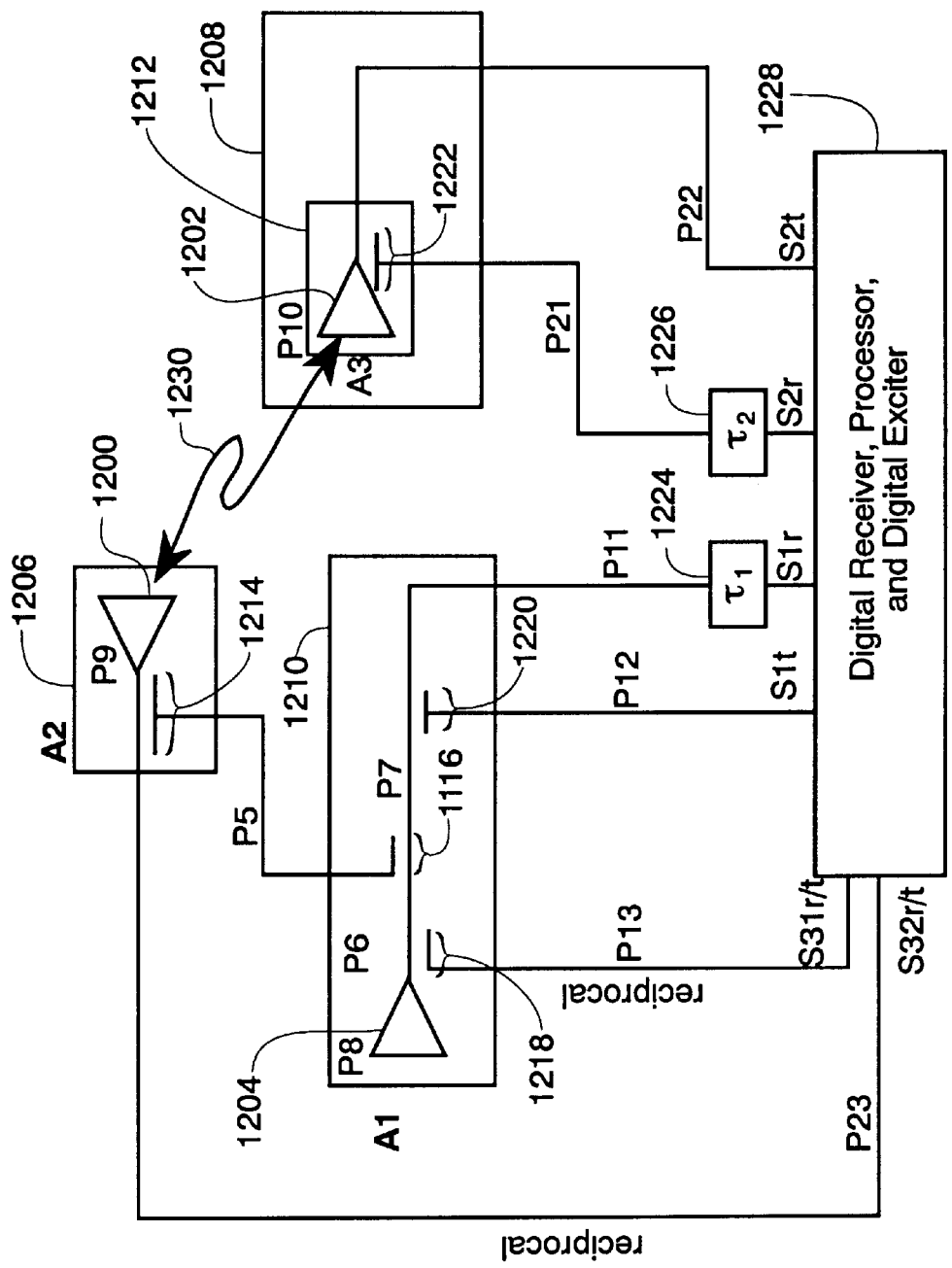
FIG. 12 shows another arrangement of a time difference of arrival-responsive locator system according to the present invention.

For the present invention use, therefore, the calibration system is disposed only in the long baseline interferometer aircraft. In this interferometer arrangement calibration involves solving eight independent time delay equations having eight unknowns. One of the unknowns (Pf) is the time delay of a free space path between the aircraft and the tethered antenna assembly. Therefore the calibration process also determines the separation between an antenna on the aircraft and the tethered antenna. FIG. 12 in the drawings provides details of the interferometer and its calibration in this instance.

In the FIG. 12 interferometer two signal reception antennas are used to collect signals from the emitter source to be located: these antennas are a forward looking antenna at 1204 and a tethered antenna at 1202. A third aft looking antenna at 1200 is added for the calibration process herein described. These three antennas are coupled to the digital receiver, processor and digital exciter 1228 by way of six signal communication paths. Two of these FIG. 12 signal communication paths, the paths P13 and P23 are reciprocal or bi-directional in nature and two of the paths, the paths at P21 and P22 are of appreciable but initially imprecise (but subsequently calibrated) length since they extend between the interferometer aircraft and the tethered antenna assembly 1212. Each of the FIG. 12 antennas is preferably manufactured as a unit and provided with a calibration table to be loaded into the processor portion of the digital receiver, processor and digital exciter of block 1128 whenever an antenna is replaced.

In paths P11 and P21 the analog delay element $\tau_1$ and $\tau_2$ are added which again enable greater accuracy of emitter source locations by providing between-clock resolution.

In the FIG. 12 interferometer the following eight time delay equations can be written. These equations each start with a transmitted signal and end with a received signal. For example S1t is the time of the transmitted signal and S1r is the time of the received signal. The units of each equation parameter is time. The equations represent the time delay around the various loops which may be defined in the FIG. 12 interferometer. The eight equations enable solutions for each of the eight unknowns of P11, P12, P21, P22, P13, P23, Pf, and P5. The remaining paths in the FIG. 12 interferometer are assumed to be known from a factory calibration event. For example, P22 is the path from the digital exciter portion of the digital receiver, processor and digital exciter 1228 to the coupler 1222 in the tethered antenna assembly. This path includes the fiber optic link from the aircraft to the tethered antenna. Path P10 is the path from the coupler 1222 to free space. This path P10 is assumed to be known. The eight equations relating to FIG. 12 are:

S1t+P12+P11=S1r (50)

S1t+P12+P76+P13+P3r=S31r (note P3r is from FIG. 11) (51)

S2t+P22+P10+P9+Pf+P23+P3r=S32r (52)

S2t+P22+P21=S2r (53)

S31t+P3t+P13+P67+P11=S1r (note P3t is from FIG. 11) (54)

S32t+P3t+P23+P9+Pf+P10+P21=S2r (55)

S32t+P3t+P23+P5+P7+P11=S1r (56)

S1t+P12+P7+P5+P9+Pf+P10+P21=S2r (57)

These equations represent eight equations having eight unknowns. The equations can be solved if they are independent. To determine if they are independent the equations may be rewritten in matrix form and the value of the determinant calculated.

$$\begin{bmatrix} 1 & 1 & 0 & 0 & 0 & 0 & 0 & 0 \\ 0 & 1 & 0 & 0 & 1 & 0 & 0 & 0 \\ 0 & 0 & 0 & 1 & 0 & 1 & 1 & 0 \\ 0 & 0 & 1 & 1 & 0 & 0 & 0 & 0 \\ 1 & 0 & 0 & 0 & 1 & 0 & 0 & 0 \\ 0 & 0 & 1 & 0 & 0 & 1 & 1 & 0 \\ 1 & 0 & 0 & 0 & 0 & 1 & 0 & 1 \\ 0 & 1 & 1 & 0 & 0 & 0 & 1 & 1 \end{bmatrix} \begin{bmatrix} P11 \\ P12 \\ P21 \\ P22 \\ P13 \\ P23 \\ Pf \\ P5 \end{bmatrix} = \begin{bmatrix} S1r - S1t \\ S31r - S1t - P76 - P3r \\ S32r - S2t - P9 - P10 - P3r \\ S2r - S2t \\ S1r - S31t - P67 - P3t \\ S2r - S32t - P9 - P10 - P3t \\ S1r - S32t - P7 - P3t \\ S2r - S1t - P9 - P10 - P7 \end{bmatrix} \quad (58)$$

Determinant Value=8

Since the value of the determinant is non zero the equations have a solution.

The matrix equation (58) can be solved for the P11 through P5. The solution is $$\begin{bmatrix} P11 \\ P12 \\ P21 \\ P22 \\ P13 \\ P23 \\ Pf \\ P5 \end{bmatrix} = \begin{bmatrix} 0.5 & -0.5 & 0 & 0 & 0.5 & 0 & 0 & 0 \\ 0.5 & 0.5 & 0 & 0 & -0.5 & 0 & 0 & 0 \\ 0 & 0 & -0.5 & 0.5 & 0 & 0.5 & 0 & 0 \\ 0 & 0 & 0.5 & 0.5 & 0 & -0.5 & 0 & 0 \\ -0.5 & 0.5 & 0 & 0 & 0.5 & 0 & 0 & 0 \\ 0 & 0.5 & 0 & 0 & -0.5 & 0.5 & 0.5 & -0.5 \\ 0 & -0.5 & 0.5 & -0.5 & .5 & 0 & -0.5 & 0.5 \\ -0.5 & 0 & 0 & 0 & 0 & -0.5 & 0.5 & 0.5 \end{bmatrix} \begin{bmatrix} S1r1t \\ S31r1t - P76 - P3r \\ S32r2t - P9 - P10 - P3r \\ S2r2t \\ S1r31t - P67 - P3t \\ S2r32t - P9 - P10 - P3t \\ S1r32t - P7 - P3t \\ S2r1t - P9 - P10 - P7 \end{bmatrix} \quad (59)$$

Note the notation change S1r1t=S1r−S1t, S31r1t=S31r−S1t, etc.

Applying the matrix multiplication and simplifying results in the solution for the eight paths.

P11=0.5 (S1r1t−S31r1t+S1r31t)+0.5 (P3r−P3t) (60)

Since S1r1t, S31r1t, and S1r31t are measured values and P3r and P3t are assumed known from factory calibration P11 has now been determined (i.e. calibrated). If P3r or P3t has changed from the factory calibration then P11 has been determined but determined with an error. An error analysis will be included later to assess the impact of any error.

P21=0.5 (S2r2t−S32r2t+S2r32t)+0.5 (P3r−P3t) (61)

Pf=0.5 (−S31r1t+S32r2t−S2r2t+S1r31t−S1r32t+S2r1t)−(P9+P10) (62)

The three paths P11, P21, and Pf are the only three paths that need to be known for the function of the invention. Observe that Pf is correctly calibrated even if P3r and P3t change from the factory calibrated values since P3t and P3r do not appear in equation (62). P11 and P21 allow the measurements at S1r and S2r to determine the time of arrival (TOA) and Pf provides the range between antennas 1206 and 1202 to provide one dimension in the location of the tethered antenna 1202 with respect to the aircraft.

It is also observed that if the values of P3r and P3t change from their factory calibrated values, and this change is unknown, the change does not result in an error in determination of TDOA. The reason for this is that both P11 and P21 are calibrated with the exact same error. That is they are both wrong by the same amount. Therefore, while the time of arrival (TOA) at S1r and S2r will be measured in error the time difference of arrival (TDOA) will be measured correctly.

While the other paths do not have to be determined for the function of the invention they are included here for completeness.

$$P13=0.5\ (-S1r1t+S31r1t+S1r31t)\ -P76-0.5\ (P3r+P3t) \quad (63)$$

$$P23=0.5\ (S31r1t-S1r31t+S2r32t+S1rt-S2r1t)-0.5\ (P3r+P3t) \quad (64)$$

$$P12=0.5\ (S1r1t+S31r1t-S1r31t)-0.5\ (P3r-P3t) \quad (65)$$

$$P22=0.5\ (S32r2t-S2r2t+S2r32t)-0.5\ (P3r-P3t) \quad (66)$$

$$P5=0.5\ (-S1r1t-S2r32t+S1r32t+S2r1t)-P7 \quad (67)$$

Now returning to equations (60) and (61) and paths P11 and P21. A signal SU arrives at antenna A1 and A3 with TOA1=SU1 and TOA3=SU3.

The TDOA is then equal to $$TDOA=SU1-SU3 \quad (68)$$

This is the actual TDOA of the two signals at the receive antenna. The measured time of arrival at S1r and S2r is $$TOA1m=SU1+P8+P67+P11 \quad (69)$$

$$TOA2m=SU3+P10+P21 \quad (70)$$

The measured time difference of arrival (TDOAm) is then $$TDOAm=TOA1m-TOA2m \quad (71)$$

$$TDOAm=(SU1-SU3)+P8+P67-P10+(P11-P21) \quad (72)$$

The actual TDOA at the antenna is then $$TDOA=TDOAm-P8-P67+P10-(P11-P21) \quad (73)$$

The time difference of arrival (TDOA) at the antenna has now been determined because all the values to the right of the equal sign in equation (73) are known. That is
1. P8, P67 and P10 are known from factory calibration.
2. TDOAm is a measured value and $$3.\ P11-P21=0.5\ [(S1r1t-S2r2t)+(S32r2t-S31r1t)+(S1r31t-S2r32t)] \quad (74)$$

and all the Sirjt terms in (74) above are measured during the calibration process. Observe that P3r and P3t do not appear in equation (74) so even if they drift from their factory calibration values TDOA is determined correctly.

In FIG. 12 only paths P11 and P21 include the between-clock pulse analog delay line usable to eliminate clock interval ambiguity in the time difference of arrival of the received emitter signal. The other paths do not need an analog delay line because, for the calibration signals, a chirp waveform can be used. There is no ambiguity in a chirp waveform because its frequency changes with time. (In contrast, for a constant frequency signal, each succeeding cycle is the same as the previous cycle, hence, ambiguity prevails.) For the initial calibration $\tau_1$ and $T_2$ can be set to zero. Then they can also be calibrated to verify that each command state change is as expected.

In FIG. 12 paths P6, P7, P8, P9, and P10 are not calibrated in real time but are calibrated in the factory. To minimize errors, antenna Al can incorporate paths P6, P7, and P8 and be replaced as a unit including transfer to a new factory calibration table. Note that paths P6, P7, and P8 are very short rigid paths and are again amenable to thermocouple temperature measurement and a calibration table disclosing time delay as a function of temperature. Again both A2 and A3 are small and very rigid. In FIG. 12, the main path requiring calibration is the path P21 time delay from the tethered antenna 1212 to the receiver 1228. This path length, because of each tethered antenna assembly possibly having a different towline, can be of different length for each use of the invention.

An important path in the FIG. 12 interferometer is the atmospheric path $P_f$ between aircraft antenna 1206 and tethered antenna 1202. This path $P_f$ is useful in determining L, the long baseline interferometer length in the calibration equations for the tethered antenna embodiment of the invention. For geo-location of the radio frequency signal emission source (i.e., for source location with respect to the earth) the angle of the tethered antenna assembly, with respect to the aircraft, must also be known. One straightforward approach to locating the tethered antenna assembly in angle is by way of an additional large baseline interferometer, of the type disclosed herein or some other type, disposed on the emitter-locating search aircraft. One set of antennas for such an additional interferometer may for example be located on the wing tips of the search aircraft. Another pair of such interferometer antennas may additionally be located at the top of the vertical tail and at the aircraft bottom. A limitation of this latter vertical long baseline interferometer is, of course, the length of the vertical tail. Other approaches to determining the tethered antenna location with respect to the search aircraft may employ an on board laser system as is known in the art to track the tethered antenna from the search aircraft. Such a laser may also be used to provide an independent measure of tethered antenna range. A third arrangement for locating the tethered antenna may employ a differential global positioning system receiver disposed at the tethered receive antenna.

Advantages and Features

The present interferometer arrangements employs two platforms to obtain angle and range or alternately one platform flying for a few seconds to obtain multiple line of bearing data (i.e., angles of arrivals) with respect to a distant source of emission. In both of these cases range is determined by the intersection of multiple lines of bearings. In this invention therefore, time difference of arrival is used to determine line of bearing to the emission source and time difference of arrival rate is used to determine range. Using time difference of arrival and time difference of arrival rate algorithms, especially algorithms allowing resolution intermediate system clock pulses, from a large baseline interferometer is one aspect of this invention. Use of a tethered antenna as one source of long baseline interferometer signal is another aspect of the present invention. Calibration of initially undetermined long baseline lengths both at the outset of system operation and during use of the interferometer and especially in the instance of a towline tethered antenna is another aspect of the invention.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. Time difference of arrival long baseline interferometer tethered antenna airborne radio frequency signal emitter locating apparatus comprising the combination of:

a search aircraft containing a radio frequency receiver and a first radio frequency antenna and trailing a second radio frequency antenna communicating into said aircraft via a tethering first signal conveying member;

said first and second radio frequency antennas communicating a signal from said radio frequency signal emitter to said radio frequency receiver during propagation time difference-segregated events;

time difference of arrival signal processing apparatus disposed in said aircraft in communication with an output signal of said radio frequency receiver, said apparatus being responsive to a selected range of arrival time differences of said signal from said radio frequency signal emitter at said first and second radio frequency antennas in generating an angle of arrival output signal;

selectively operable signal propagation time delay calibration apparatus electively connectable with said tethering first signal conveying member and with additional signal propagating paths interconnecting said first and second antennas, said radio frequency receiver and said time difference of arrival signal processing apparatus and generating measurement data representative of environment-induced changes in signal propagation delay attending said tethering first signal conveying member and said additional signal propagating paths.

2. The time difference of arrival long baseline interferometer tethered antenna airborne radio frequency signal emitter locating apparatus of claim 1 wherein said tethering first signal conveying member and said additional signal propagating paths are comprised of one of an electrical signal conveying conductor and an optical signal conveying conductor.

3. The time difference of arrival long baseline interferometer tethered antenna airborne radio frequency signal emitter locating apparatus of claim 1 wherein said time difference of arrival signal processing apparatus also includes a time difference of arrival rate of change-responsive processing mathematical algorithm.

4. The time difference of arrival long baseline interferometer tethered antenna airborne radio frequency signal emitter locating apparatus of claim 3 wherein said time difference of arrival signal processing apparatus includes a thermal effects-correctable signal propagation time-responsive mathematical algorithm.

5. The time difference of arrival long baseline interferometer tethered antenna airborne radio frequency signal emitter locating apparatus of claim 4 wherein said time difference of arrival signal processing apparatus mathematical algorithm includes algorithm adjustment parameters determined by said signal propagation time delay calibration apparatus-determined changes in signal propagation delay in said tethering first and additional signal conveying members of said signal emitter locating apparatus.

6. The time difference of arrival long baseline interferometer tethered antenna airborne radio frequency signal emitter locating apparatus of claim 1 wherein said trailing second radio frequency antenna is disposed contiguous a tether-connected disposable housing propelled by said aircraft.

7. The time difference of arrival long baseline interferometer tethered antenna airborne radio frequency signal emitter locating apparatus of claim 1 further including control apparatus connected with said selectively operable signal propagation time delay calibration apparatus and generating an intermixed cycle of signal emitter locating and calibrating events in said signal emitter locating apparatus.

8. The time difference of arrival long baseline interferometer tethered antenna airborne radio frequency signal emitter locating apparatus of claim 1 wherein said radio frequency signal emitter is a pulsed radar apparatus and wherein said time difference of arrival signal processing apparatus includes a mathematical algorithm responsive to output pulses of said pulsed radar apparatus.

9. Airborne long baseline interferometer time difference of arrival radio frequency signal emitter source locating apparatus comprising the combination of:

a signal emitter search aircraft containing a first and second input ported radio frequency receiver and input and output signal conveying members connected therewith;

said first and second input ported radio frequency receiver being disposed in receipt of signals from said radio frequency signal emitter source by way of first and second antenna members disposed in physically separated portions of said aircraft and said signal conveying members;

time difference of arrival signal processing apparatus received in said aircraft in communication with output signals of said first and second input ported radio frequency receiver, said apparatus being responsive to ranges of arrival time difference and arrival time difference rate occurring in signals from said radio frequency signal emitter source output by said first and second radio frequency receivers;

selectively operable signal propagation time delay calibration apparatus electively connectable with said signal conveying members in paths interconnecting said first and second antennas with said first and second input ported radio frequency receiver and said time difference of arrival signal processing apparatus and generating picosecond-resolved time delay calibration data representing environment-induced changes in signal propagation delay time attending signal propagation in said signal conveying members.

10. The airborne long baseline interferometer radio frequency signal emitter source locating apparatus of claim 9 wherein said physically separated portions of said aircraft first and second antenna members are disposed in one of:

leading and trailing portions of said aircraft, upper and lower portions of said aircraft;

starboard and port portions of said aircraft; and aircraft and aircraft-tethered trailing object locations.

11. The airborne long baseline interferometer radio frequency signal emitter locating apparatus of claim 9 wherein said aircraft includes first and second of said long baseline interferometer radio frequency signal emitter source locating apparatus, and pairs of long baseline antenna members connected therewith, capable of determining both azimuth and elevation locations of said radio frequency signal source.

12. The airborne long baseline interferometer radio frequency signal emitter locating apparatus of claim 11 wherein first and second antenna members of a first of said long baseline interferometer radio frequency signal emitter source locating apparatus antenna pairs and first and second antenna members of a second of said long baseline interferometer radio frequency signal emitter source locating apparatus antenna pairs are disposed at first and second different antenna pair locations of:

leading and trailing antenna pair portions of said aircraft, upper and lower antenna pair portions of said aircraft;

starboard and port antenna pair portions of said aircraft; and aircraft and aircraft-tethered trailing object antenna pair locations.

13. The airborne long baseline interferometer radio frequency signal emitter locating apparatus of claim 9 wherein:

said first and second of said long baseline interferometer radio frequency signal emitter source locating apparatus each include signal communication paths characterized by signal delay propagation characteristics;

said signal delay propagation characteristic signal communication paths include adjustable analog signal delay elements, capable of resolving signal arrival times occurring intermediate two successive system clock events, disposed in selected signal communicating paths of said airborne long baseline interferometer radio frequency signal emitter locating apparatus, and said airborne long baseline interferometer radio frequency signal emitter locating apparatus further includes signal generating, picosecond-resolved, propagation delay calibration apparatus connected with selected locations of said signal communication paths.

14. The portable platform-contained method for locating a distant source of pulsed radio frequency energy comprising the steps of:

applying a time difference of arrival first algorithm to a first pulsed electrical signal received at baseline-segregated first and second receiver antennas on said portable platform, a first pulsed electrical signal received from said distant source of radio frequency energy;

said time difference of arrival first algorithm determining from said first and second antenna-received first pulsed electrical signal an azimuth angle of arrival vector connecting said portable platform with said distant source of pulsed radio frequency energy;

applying a time difference of arrival rate-responsive second algorithm to a sequential pair of time difference of arrival values, values relating to said first pulsed electrical signal and a second pulsed electrical signal from said first and second antennas and said distant source of radio frequency energy, to determine a range distance, along said azimuth angle of arrival vector, between said portable platform and said distant source of radio frequency energy;

recalibrating said first and second algorithms in an accommodating response to environment-induced changes in time delay encountered by said pulsed electrical signals while traveling between said antennas and a receiver output port;

said recalibrating including measuring time delay-encountered by calibration sample signals communicating along signal paths traveled by said distant source pulsed electrical signals in traveling between said antennas and said receiver output port;

said recalibrating being performed intermediate usings of said algorithms at intervals enabling a selected degree of accuracy in said locating of a distant source of pulsed radio frequency energy.

15. The method for locating a distant source of pulsed radio frequency energy of claim 14 wherein:

said portable platform comprises an aircraft;

one of said signal paths traveled by said pulsed electrical signals in traveling between said antennas and said receiver output port contains signal communicating between a trailing antenna and said aircraft.

16. The method for locating a distant source of pulsed radio frequency energy of claim 14 further including the step of coupling signals from said trailing antenna with said aircraft by way of a tethering optical signal path.

17. The portable platform-contained method for locating a distant source of pulsed radio frequency energy of claim 14 including repeating said steps during each of an azimuth and an elevation locatings of said distant source of pulsed radio frequency energy.

18. The portable platform-contained method for locating a distant source of pulsed radio frequency energy of claim 14 wherein said recalibrating intervals enabling a selected degree of accuracy in said locating of a distant source of pulsed radio frequency energy also enable time difference of arrival determinations accurate within tens of picoseconds less than one hundred picoseconds.

19. The portable platform-contained method for locating a distant source of pulsed radio frequency energy of claim 14 wherein said environment-induced changes in time delay comprise thermally induced time delay changes in physical components performing said method.

* * * * *